United States Patent [19]

Deem et al.

[11] 4,384,293
[45] May 17, 1983

[54] APPARATUS AND METHOD FOR PROVIDING POINTING INFORMATION

[75] Inventors: Paul S. Deem, San Pedro; Paul H. Grobert, Granada Hills, both of Calif.

[73] Assignee: Magnavox Government and Industrial Electronics Company, Fort Wayne, Ind.

[21] Appl. No.: 188,368

[22] Filed: Sep. 18, 1980

[51] Int. Cl.³ .............................................. G01S 5/02
[52] U.S. Cl. ........................ 343/113 R; 343/100 ST; 343/100 SA
[58] Field of Search .................. 343/100 SA, 100 ST, 343/113 R, 115, 854

[56] References Cited

PUBLICATIONS

Global Positioning System, The Institute of Navigation, Washington, D.C., 1980, No. 0-936406-00-3.

Primary Examiner—Theodore M. Blum
Attorney, Agent, or Firm—Charles H. Schwartz; Ellsworth R. Roston

[57] ABSTRACT

An apparatus and method for providing pointing information in accordance with a reference signal produced by at least one GPS satellite, including a pair of antenna elements for individually receiving the reference signal produced by at least one GPS satellite and for producing output signal in accordance with the received reference signal, the pair of antenna elements spaced from each other a fixed distance along a line to provide for a difference in phase between the reference signal as received at one antenna relative to the other antenna in accordance with the pointing angle of the pair of antennas along the line relative to the direction of the GPS satellite, means responsive to the output signals produced by the pair of antenna elements for producing a phase difference signal in accordance with the difference in phase between the reference signal as received at the one antenna relative to the other antenna, and means responsive to the phase difference signal produced by the last mentioned means for calculating the pointing angle of the pair of antennas along the line.

8 Claims, 6 Drawing Figures

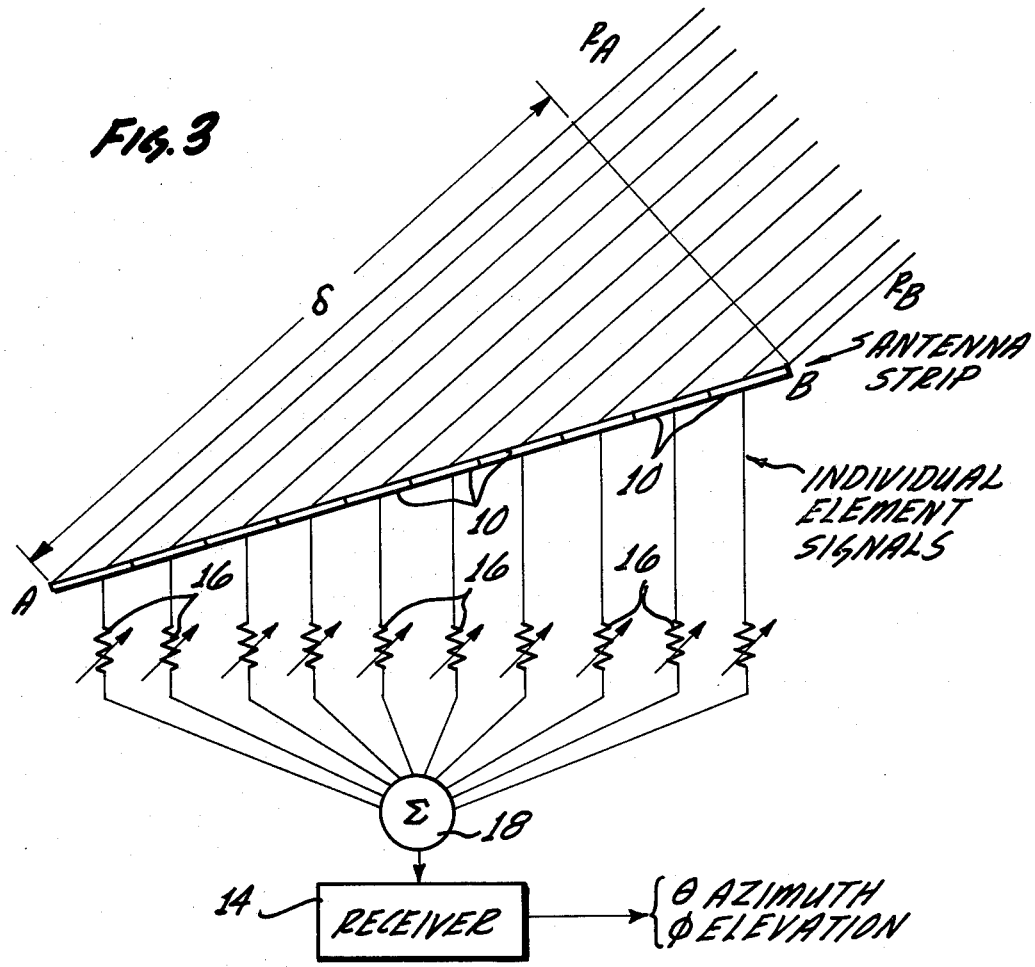
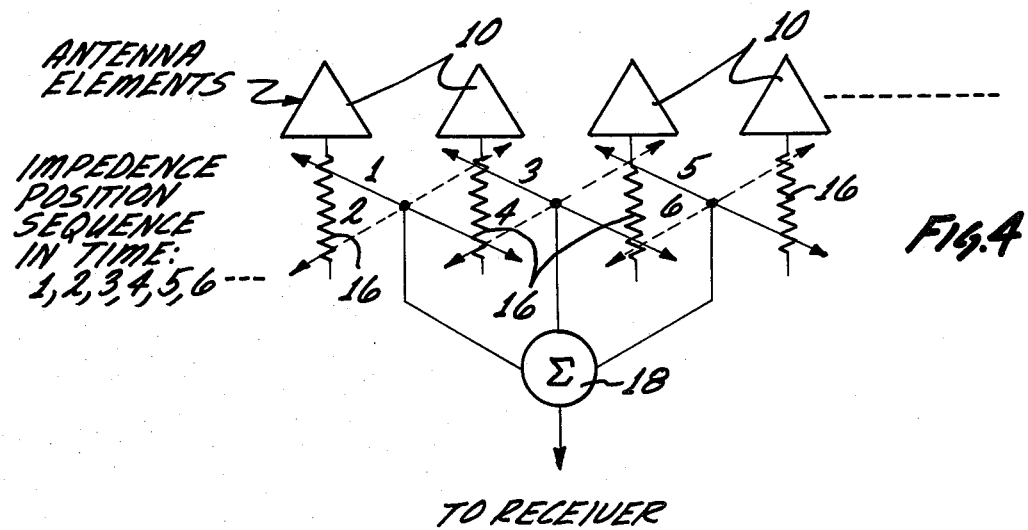

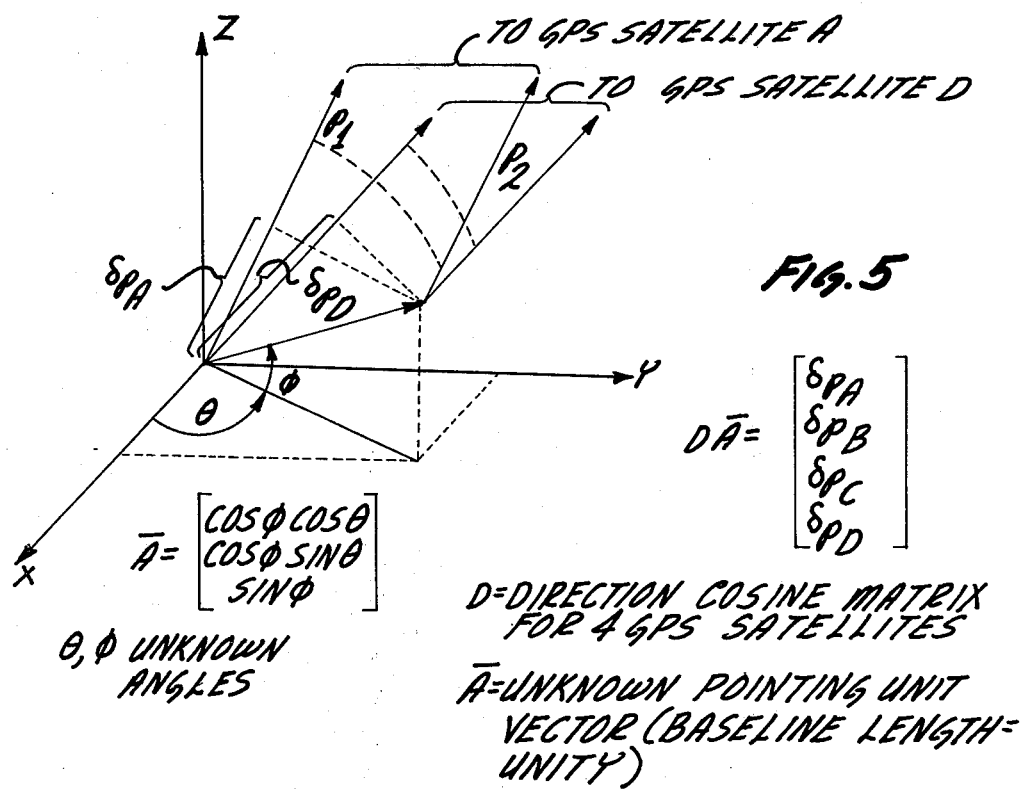
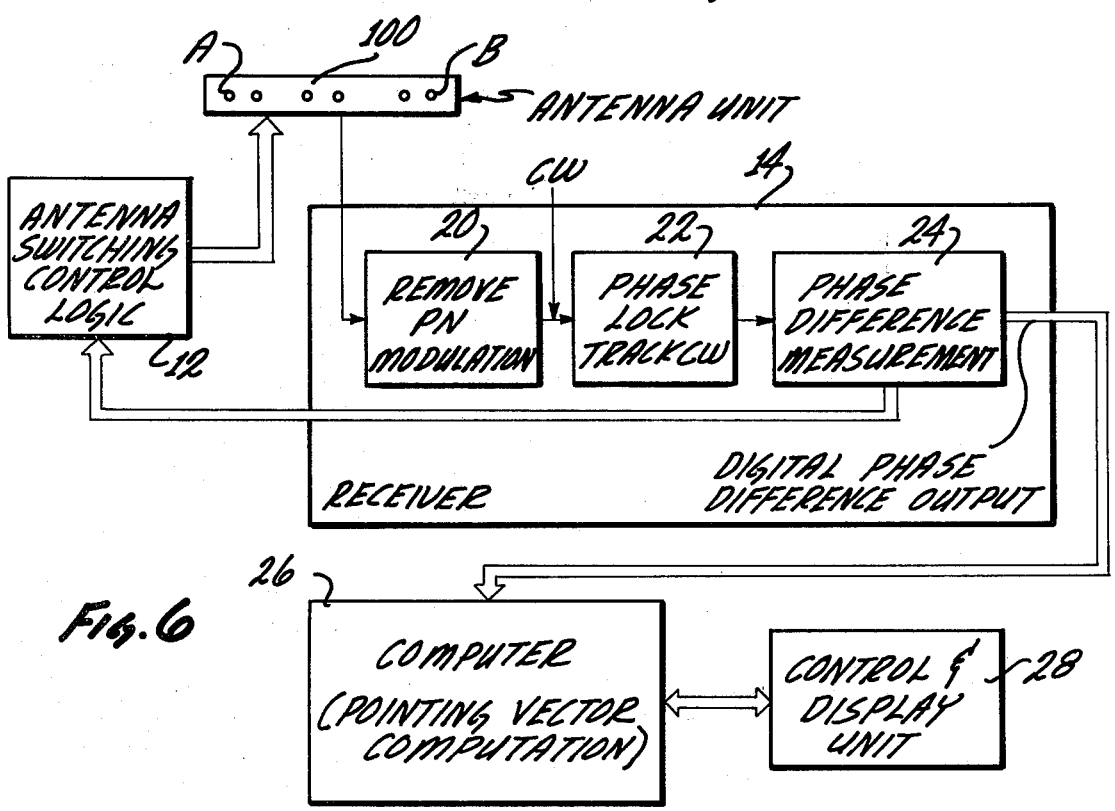

APPARATUS AND METHOD FOR PROVIDING POINTING INFORMATION

The present invention is directed to an apparatus and method for providing precise pointing or angular information. In particular the present invention provides for the pointing information such as two or three dimensional pointing vector information using reference signals produced by the Global Positioning System (GPS) currently being implemented.

The Global Positioning System (GPS) is in the process of being implemented so as to provide for worldwide positioning and navigational capabilities. The GPS system utilizes RF signals transmitted from a plurality of satellites which orbit the earth. In particular it has been proposed to use a total of twenty four (24) satellites operating individually in twelve (12) hour orbits so as to provide for a visibility of between six to eleven satellites at five degrees or more above the horizon to users located anywhere in the world and at any time. RF signals are transmitted from the satellites at two L-band frequencies and with the signals modulated by two codes so as to provide for a precision measurement of time and to provide for an identification for each individual satellite.

The GPS system will provide extremely accurate three dimensional position and velocity information to users anywhere in the world. The position determinations are based on the measurements of the transit time of RF signals from four satellites out of the total constellation of twenty four satellites. The GPS system and its present level of implementation has been discussed in numerous papers. As a specific example reference is made to a collection of these papers which were originally published in "Navigation" and with the collection entitled "Global Positioning System" and reprinted by The Institute of Navigation, Wash., D.C. in 1980 and with the collection having an International Standard Book Number of 0-936406-00-3. Reference is also made to the summer 1978 issue of "Navigation", Journal of the Institute of Navigation, Volume 25, number 2, which originally included many of the papers present in the above-referenced collection. The publications described above and other such publications provide for a detailed description of the GPS system and reference is therefore made to these publications for such description.

The GPS system provides for very precise position information for a user of the system. However, in many instances the precise coordinate information provided by the GPS system is insufficient information for a particular use. For example, in the application of thrust to adjust the orbital parameters of an earth satellite or in the precise delivery of ballistic weapons there is a requirement for a reference for direction in the application of thrust. In addition, although the GPS system provides for precise velocity information, this information is often inadequate for a particular system operation since both the vehicle heading and its orientation is also needed.

The present invention is directed to an apparatus and method for obtaining two or three dimensional pointing information using the reference signals provided by the current GPS system. The information produced by the present invention enhances the suitability of the GPS system for space, missile or artillery operations. Moreover, the apparatus and method of the present invention is simple in structure and in operation when compared to present methods of providing such pointing information. In general the apparatus and method of the present invention provides for the two or three dimensional pointing information from the GPS system by the use of interferometry. Specifically, the interferometric technique of the present invention provides for the pointing information by the use of a pair of spaced antennas separated at a fixed distance and with the difference in phase between the signals received at the two antennas providing for a phase difference signal which may in turn be used to provide for the computation of a pointing vector.

It is to be appreciated that angular information, unlike position and velocity information, requires a determination of the physical orientation of a body in space. In the past, common means of establishing such a physical orientation were through the use of highly-stable gyros, compasses, plumbobs or bubble levels and interferometric devices. Each of the approaches used in the prior art includes some set of limitations. For example, gyros must be kept from drifting and they are generally delicate, expensive devices. Compasses are usually very limited in accuracy and are susceptible to biasing when near large metal masses. Plumbobs or bubble levels are cumbersome, are generally not accurate and do not lend themselves to compact automated use.

The interferometric devices which have been used in the past to compute angular data have, in most cases, required a long baseline so as to provide for high accuracy. Since the prior art interferometric devices require a long baseline, the devices would typically include a physical movement of a receiving device from one position to another position and with this movement being provided very accurately in direction and distance.

The apparatus and method of the present invention may generally be described as a short baseline interferometric device which uses a plurality of antennas fixed in position and spaced from each other along a line by a predetermined distance. The device of the present invention uses the GPS signals which are being sent from one or more satellites so as to determine the angular orientation of the spaced antennas along the line in either two or three angular dimensions. The two angular dimensions may be referred to as azimuth and elevation and the three angular dimensions may be referred to as azimuth, elevation and roll.

The device of the present invention provides tracking of the signal from one or more of the GPS satellites from the first to the second spaced antenna. The difference in phase between the signal as received at the first and second antennas represents a difference in distance between the first and second antennas and the GPS satellite and this difference is used to provide for the calculation of the angular information. In a particular embodiment of the device of the present invention the L-band carrier signal data received from the GPS satellite is tracked using a special "Ripple" antenna configuration. This configuration uses a multiplicity of antenna elements interspaced between the first and second spaced antenna elements and with the distance between the individual elements less than one half the carrier wavelength so as to eliminate tracking ambiguity.

In addition to the uses generally described above, the present invention is useful for many other purposes. For example, the pointing information provided by the apparatus and method of the present device may be used to provide for surveying, aircraft navigation, target tracking and satellite orientation. As a two dimensional target location device the device of the present invention may be used to enhance the fire power and tactical mobility of devices such as tanks or artillery. The apparatus of the present invention may be combined with a device such as a laser range measuring device so as to accurately locate targets when the coordinates of the target are not known. In general, the applications for the device of the present invention are numerous and may be used whenever the pointing information in either two dimension or three dimension will provide for an enhanced operation.

A clearer understanding of the present invention will be had with reference to the following descriptions and drawings wherein FIG. 1 illustrates the basic principle used in the apparatus and method of the present invention and specifically illustrates the details of the geometry;

FIG. 3 illustrates the production of the output signal from the multi-element antenna;

FIG. 4 illustrates the "Ripple" reception sequencing of the various antenna elements;

FIG. 5 illustrates a two dimension pointing geometry for the present invention; and FIG. 6 illustrates a block diagram of an apparatus for providing for the output signals representative of the pointing vector information.

Figure 1:
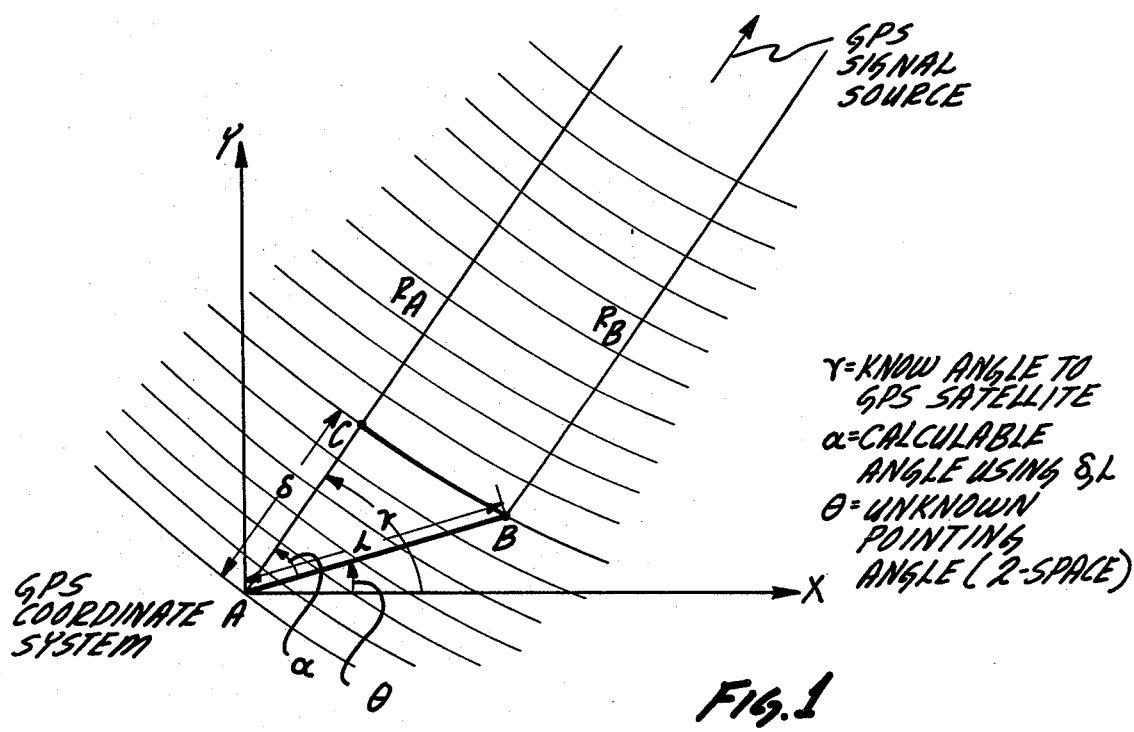

In the apparatus and method of the present invention an interferometric technique is used with at least a pair of fixed spaced antenna elements. These antenna elements are shown in FIG. 1 to be located at points A and B and are separated by a fixed distance L. For the typical frequency of a signal from the GPS satellite, the antenna separation L between points A and B may be ten wavelengths which would be about two meters. In general, the present invention provides a phase measurement by moving the phase center of the signal received at the spaced antenna elements from point A to point B. The signal is moved along the distance of ten wavelengths between point A and point B without breaking a phase lock on the carrier wave. The ten wavelengths distance therefore represents the interferometric baseline. FIG. 1 illustrates the details of the geometry in a single plane but it is to be appreciated that the same measurements can be made relative to more than one satellite so that two or three dimensional solutions may be produced to determine the angular orientation of the pointing vector of the two spaced antennas in either two or three angular dimensions.

As shown in FIG. 1 the output angle $\alpha$ is determined by computing the length $\delta$ of the side (AC) of the triangle. The representation shown in FIG. 1 illustrates the solution for the one angle $\theta$. The precise location of the GPS signal source is known and therefore the angle $\gamma$ is known. The angle $\theta$ can then be calculated using the formula $\cos \alpha = \delta/L$. Therefore, as shown in FIG. 1, $\theta = \gamma - \alpha$. Since the accuracy of the angle $\gamma$ is very high since the GPS satellite positions are well known, the accuracy of $\theta$ equals the accuracy of the measurement of $\alpha$.

In order to measure the distance $\delta$ the quantity $(R_A - R_B)$ must be computed where $R_A$ and $R_B$ are the ranges from the GPS satellite to the two antenna positions A and B. The actual ranges $R_A$ and $R_B$ would not be used since a large error could be introduced when making such a measurement. In the present invention the differential range distance is measured. This is accomplished by first tracking the GPS carrier signal at the antenna element at point A and then without losing the carrier tracking lock, phase tracking the signal at the antenna element at point B. The phase tracking may be accomplished using a phase lock loop tracking system. Since this type of carrier tracking loop cannot discriminate between phase changes in excess of $\lambda/2$ (where $\lambda$ equals the carrier wavelength), the transition from the antenna of point A to the antenna at point B must be resolved without introducing an ambiguity in the measurement.

In the particular embodiment of the device shown in the present application, the transition from the antenna at point A to the antenna at point B is made in steps less than $\lambda/2$ by using a series of intermediate antennas between the antennas at points A and B. This may be seen with reference to FIG. 2 where it can be seen that a plurality of individual antenna elements 10 are located along the length of a strip of antenna elements intermediate the points A and B. The output from each individual antenna elements is controlled in accordance with an antenna switching control logic 12 so that output signals are produced sequentially to ripple down the line of antennas 10 from the point A to the point B. The antenna switching control logic 12 is in turn under control of the receiver 14 to ensure that the sequential switching occurs in accordance with the measurement of phase signals.

Figure 2:
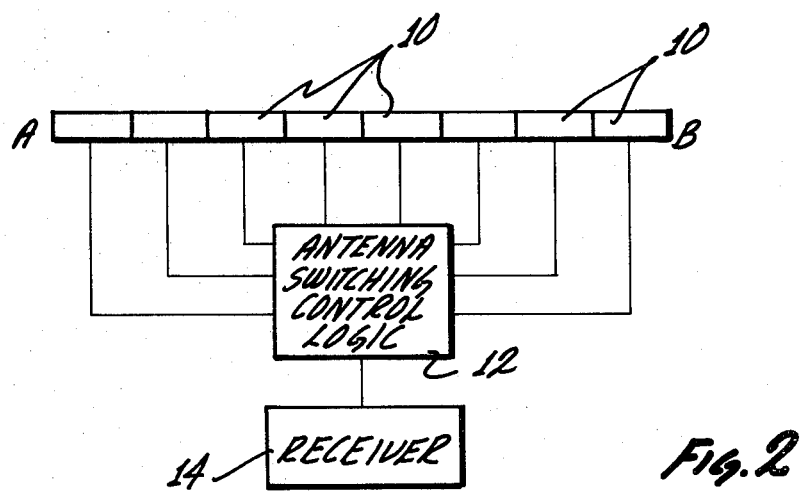
FIG. 2 illustrates a multi-element antenna and with the control of the tracking of the input signal to determine the phase difference between the first and last antenna element.

As shown in FIG. 3 it can be seen that the output of each of the individual antenna elements 10 is coupled through a variable impedance element 16 to a summer 18. Each variable impedance element 16 is controlled by the antenna switching control logic 12, as shown in FIG. 2, so as to ripple the effective reception point at the summer 18 down the strip of antenna elements 10 beginning at point A and ending at point B. The output signals from the individual antenna elements 10, summed by the summer 18, are coupled to the receiver 14. The output from the receiver 14 is used to provide for the computation of the pointing information. For example, in the case of two dimensions, the pointing information would represent the azimuth and elevation of the antenna elements along the line.

The use of the ripple technique with intermediate antenna elements spaced less than $\lambda/2$ from each other allows the distance $\delta$ to be determined quickly and accurately without ambiguity as to the number of cycles of phase change. It is to be appreciated that in place of the use of a plurality of intermediate antenna elements, the ambiguity may also be eliminated using other techniques. For example, a single antenna element may be positioned intermediate the antenna elements at points A and B and with a different unique distance between the intermediate antenna element and each of the antennas at the points A and B. With this construction the ambiguity as to the number of cycles of phase change between the elements A and B may be eliminated by calculating the phase change and using a measurement of the phase change at the intermediate antenna element and using the unique distances between the intermediate antenna element and the antennas at the points A and B as part of the calculation. Similarly, only two spaced antenna elements at points A and B may be used but with the reception at these antenna elements of two different carrier frequencies from the GPS satellites. In this way, the differences of frequency and the resultant differences in phase between the antennas at points A and B for the different frequencies may be used so as to eliminate the ambiguity in the measurement. The particular embodiment shown in the present invention, however, provides for a simple and reliable method of transferring the signal from the antenna at point A to the antenna at point B without an ambiguity in the measurement of the difference in phase.

FIG. 4 illustrates how the output from the individual antenna elements 10 is controlled and introduced to the summing circuit 18. In particular, as the output from a first antenna element is reduced by varying its output impedance 16 to a maximum the output from the adjacent antenna element is increased by varying its output impedance 16 to a minimum. Therefore, the output from the first antenna element is continuously reduced to a minimum while the adjacent antenna element has its output continuously increased to a maximum. This happens sequentially from antenna element to antenna element so that each intermediate antenna element first has its output increased to a maximum and then decreased to a minimum. This provides for a transition from the first antenna element at point A to the last antenna element at point B by rippling the signal along the strip of antenna elements from point A to point B. As a particular example the variable impedance may be provided by a particular type of diode referred to as a pin diode. The pin diode may be controlled to provide for a variable impedance in the output path between the antenna elements 10 and the summer 18 so as to produce the rippling signal transition.

It is to be appreciated that various types of antenna elements may be used and the invention is not to be limited to any type of antenna element. Also, it is to be appreciated that the application shows, such as in FIGS. 1 and 3, antennas which receive signals from a single GPS satellite. The measurement of a particular unknown pointing vector may be provided by signals from a plurality of GPS satellites. The signals from the plurality of GPS satellites may be used to provide for either two dimensional (azimuth and elevation) or three dimensional (azimuth, elevation and roll) pointing information. As an example, FIG. 5 ilustrates a two dimensional pointing geometry for measuring two unknown angles $\theta$ and $\phi$. As shown in FIG. 5, signals may be received from a plurality of satellites, such as four, and the angles calculated from the received signals.

FIG. 6 illustrates a block diagram of a complete system for providing for the pointing vector information. As shown in FIG. 5 a complete antenna unit 100 includes the plurality of antenna elements 10 extending between the points A and B, the variable impedances 16 and the summer 18 so as to provide the output signal being rippled from point A to point B. This has been shown with reference to FIGS. 3 and 4. The ripple of the signal along the length of the antenna between points A and B is under the control of the antenna switching control 12. The output from the antenna unit 100 is applied to the receiver 14. The receiver 14 includes a stage 20 to remove the pseudo-noise modulation which would normally be included in the GPS reference signal. This type of pseudo-noise modulation to code the GPS reference signal forms no part of this invention and is a technique used with the GPS system.

The output from the stage 20 is a continuous carrier wave at the L-band frequency and the receiver includes a phase lock loop 22 to phase lock and track the continuous carrier wave. The phase change of the carrier wave between the points A and B which is captured in the phase lock loop may now be measured by a phase difference measurement circuit 24 so as to provide for an output signal. The output signal may be a digital output signal representative of the phase difference between the signal received by the antenna element at point A and the signal received by the antenna element at point B. The phase difference measurement is coordinated with the antenna switching control circuit 12.

Once the phase difference measurement is made by the phase difference measurement circuit 24 the measurement may be supplied to a computer 26 which computes the pointing vector information in accordance with the measurement technique and a specific geometry of the present invention which has been previously described. The computer 26 provides for output pointing vector information which is coupled to a control and display unit 28. The output pointing vector information may be visually displayed and may also provide for an automatic control of a specific apparatus in accordance with the pointing vector information.

It can be seen therefore that the present invention operates in conjunction with an existing GPS system and uses an interferometric technique to provide for pointing vector information in addition to the existing position and velocity information provided by the GPS system. In particular the apparatus and method of the present invention uses at least a pair of fixed spaced antenna elements and with the phase difference between the signal received from the GPS satellite at these fixed spaced antenna elements providing for a measurement of the pointing direction of the fixed spaced antenna elements.

Although the application has been described with reference to a particular embodiment, it is to be appreciated that various adaptations and modifications may be made and the invention is only to be limited by the appended claims.

We claim:

1. An apparatus for providing pointing information in accordance with a reference signal produced by at least one GPS satellite, including a pair of antenna elements for individually receiving the reference signal produced by at least one GPS satellite and for producing output signals in accordance with the received reference signal, the pair of antenna elements spaced from each other a fixed distance along a line to provide for a difference in phase between the reference signals as received at one antenna relative to the other antenna in accordance with the pointing angle of the pair of antennas along the line relative to the direction of the GPS satellite, means responsive to the output signals produced by the pair of antenna elements for producing a phase difference in phase between the reference signals as received at the one antenna relative to the other antenna and wherein the means responsive to the output signals produced by the pair of antenna elements includes means for transferring between the output signal produced by the one antenna and the output signal produced by the other antenna without losing the phase of the reference signal and wherein the means for transferring includes individual variable impedances in individual output paths from the individual antenna elements and with the variable impedances providing for the output signal from the one antenna element reduced to a minimum while the output signal from the other antenna element is increased to a maximum, and means responsive to the phase difference signal produced by the last mentioned means for calculating the pointing angle of the pair of antennas along the line.

2. The apparatus of claim 1 wherein the antenna elements receive reference signals from more than one GPS satellite for producing at least two dimensional pointing vector information.

3. A method of providing pointing information in accordance with a reference signal produced by at least one GPS satellite, including the following steps:

providing a pair of antenna elements for individually receiving the reference signal produced by at least one GPS satellite and for producing output signals in accordance with the received reference signal, providing the pair of antenna elements spaced from each other a fixed distance along a line to provide for a difference in phase between the reference signal as received at one antenna relative to the other antenna in accordance with the pointing angle of the pair of antennas along the line relative to the direction of the GPS satellite, producing a phase difference signal in accordance with the difference in phase between the reference signal as received at the one antenna relative to the other antenna, transferring between the output signal from the one antenna and the output signal from the other antenna without losing the phase of the reference signal, providing individual variable impedances in individual output paths from the individual antenna elements and with the variable impedances providing for the output signal from the one antennas element reduced to a minimum while the output signal from the other antennas element is increased to a maximum, and calculating the pointing angle of the pair of antennas along the line in accordance with the phase difference signal.

4. The method of claim 3 wherein the antenna elements receive reference signals from more than one GPS satellite and including the step of producing at least two dimensional pointing vector information.

5. An apparatus for providing pointing information in accordance with a reference signal produced by at least one GPS satellite and wherein the reference signal from the GPS satellite has a carrier frequency of λ, including a pair of antenna elements for individually receiving the reference signal produced by at least one GPS satellite and for producing output signals in accordance with the received reference signal, the pair of antenna elements spaced from each other a fixed distance along a line to provide for a difference in phase between the reference signals as received at one antenna relative to the other antenna in accordance with the pointing angle of the pair of antennas along the line relative to the direction of the GPS satellite, means responsive to the output signals produced by the pair of antenna elements for producing a phase difference in phase between the reference signal as received at the one antenna relative to the other antenna and wherein the means responsive to the output signals produced by the pair of antenna elements includes means for transferring between the output signal produced by the one antenna and the output signal produced by the other antenna without losing the phase of the reference signal and wherein intermediate the pair of antenna elements along the line are additional antenna elements for receiving the reference signal and with the spacing of adjacent intermediate antenna elements and the adjacent one of the pair of antenna elements being less than λ/2 and with the means for transferring providing for transferring between adjacent antenna elements including the intermediate antenna elements along the line of the antenna elements from the one antenna element to the other antenna element, and means responsive to the phase difference signal produced by the last mentioned means for calculating the pointing angle of the pair of antennas along the line.

6. The apparatus of claim 5 wherein the means for transferring includes individual variable impedances in individual output paths from the individual antenna elements including the intermediate antenna elements and with the variable impedances providing for the output signal from a first antenna elements reduced to a minimum while the output signal from a second adjacent antenna element is increased to a maximum to provide for a combined output signal rippled along the line of antenna elements from the one antenna element to the other antenna element.

7. A method of providing pointing information in accordance with a reference signal produced by at least one GPS satellite and wherein the reference signal from the GPS satellite has a carrier frequency of λ, including the following steps:

providing a pair of antenna elements for individually receiving the reference signal produced by at least one GPS satellite and for producing output signals in accordance with the received reference signal, providing the pair of antenna elements spaced from each other a fixed distance along a line to provide for a difference in phase between the reference signal as received at one antenna relative to the other antenna in accordance with the pointing angle of the pair of antennas along the line relative to the direction of the GPS satellite, producing a phase difference signal in accordance with the difference in phase between the reference signal as received at the one antenna relative to the other antenna, transferring between the output signal from the one antenna and the output signal from the other antenna without losing the phase of the reference signal, wherein intermediate the pair of antenna elements along the line are additional antenna elements for receiving the reference signal and with the spacing adjacent intermediate antenna elements and the adjacent one of the pair of antenna elements being less than λ/2 and with the means for transferring providing for transferring between adjacent elements along the line of the antenna elements from the one antenna element to the other antenna elements, and calculating the pointing angle of the pair of antennas along the line in accordance with the phase difference signal.

8. The method of claim 7 including the step of providing individual variable impedances in individual output paths from the individual antenna elements including the intermediate antenna elements and providing for the output signal from a first antenna element reduced to a minimum while the output signal from a second adjacent antenna element is increased to a maximum to provide for a combined output signal rippled along the line of antenna elements from the one antenna element to the other antenna element.

* * * * *